(12) United States Patent
Blanchard et al.

(10) Patent No.: US 9,283,733 B2
(45) Date of Patent: Mar. 15, 2016

(54) TRANSPARENT WINDOW PANE WITH A HEATING COATING

(75) Inventors: Ariane Blanchard, Aachen Allemagne (DE); Guenther Schall, Kreuzau (DE); Marc Maurer, Compiegne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 634 days.

(21) Appl. No.: 12/528,128

(22) PCT Filed: Feb. 19, 2008

(86) PCT No.: PCT/FR2008/050270
§ 371 (c)(1),
(2), (4) Date: Aug. 21, 2009

(87) PCT Pub. No.: WO2008/104728
PCT Pub. Date: Sep. 4, 2008

(65) Prior Publication Data
US 2010/0270280 A1    Oct. 28, 2010

(30) Foreign Application Priority Data
Feb. 23, 2007   (DE) .................. 10 2007 008 833

(51) Int. Cl.
*B60L 1/02*     (2006.01)
*B32B 17/10*    (2006.01)
(Continued)

(52) U.S. Cl.
CPC ..... *B32B 17/10183* (2013.01); *B32B 17/10036* (2013.01); *H05B 3/84* (2013.01);
(Continued)

(58) Field of Classification Search
CPC .............. B32B 17/10036; B32B 17/10183; H05B 3/84; H05B 3/86
USPC ......... 219/203, 541, 542, 543, 546, 520, 522, 219/548, 213, 219, 488, 476, 477, 478, 219/544; 49/130, 360, 423, 348, 162, 61, 49/70, 72, 26, 280, 375; 29/611, 620, 816, 29/854, 897.2, 852, 428; 428/34, 38, 428/299.1, 500, 172; 343/702, 703, 704, 343/712, 713, 793
See application file for complete search history.

(56) References Cited

U.S. PATENT DOCUMENTS 4,971,848 A    11/1990  Ruelle et al.
5,414,240 A *   5/1995  Carter et al. ............ 219/203
(Continued)

FOREIGN PATENT DOCUMENTS

DE    WO2005076061 A1 *   8/2005 ............ B60J 3/04
DE    102004005611       *  9/2005 ............ B60J 3/04
(Continued)

OTHER PUBLICATIONS

IBM Technical Disclosure Bulletin, Jul. 1980, "Analog Data Tablet", Publication Date: Jul. 1, 1980.*

*Primary Examiner* — Phuong Nguyen
(74) *Attorney, Agent, or Firm* — Oblon, McClelland, Maier & Neustadt, L.L.P.

(57) ABSTRACT

A transparent window pane including an electrically heating coating that extends over a large part of the surface of the window pane, or over its field of vision, and which is electrically connected to at least two busbars of low electrical resistance, such that, after an electrical supply voltage has been applied to the busbars, an electrical current flows in a heating field formed by the coating. Further, a heating element includes conducting elements of low electrical resistance, or printed conducting tracks and/or wires, in a zone of the surface not heated by the coating, which preferably lies on the edge of the transparent window pane and on the same face as the coating.

23 Claims, 2 Drawing Sheets

(51) Int. Cl.
*H05B 3/84* (2006.01)
*H05B 3/86* (2006.01)

(52) U.S. Cl.
CPC ........... *H05B 3/86* (2013.01); *H05B 2203/013* (2013.01); *H05B 2203/016* (2013.01); *H05B 2203/017* (2013.01); *H05B 2203/031* (2013.01)

(56) References Cited

U.S. PATENT DOCUMENTS

| | | | |
|---|---|---|---|
| 5,434,384 A * | 7/1995 | Koontz | 219/203 |
| 5,496,989 A * | 3/1996 | Bradford et al. | 219/497 |
| 5,653,903 A | 8/1997 | Pinchok, Jr. et al. | |
| 5,824,994 A * | 10/1998 | Noda et al. | 219/203 |
| 5,877,473 A | 3/1999 | Koontz | |
| 5,886,321 A * | 3/1999 | Pinchok et al. | 219/203 |
| 2003/0146199 A1 * | 8/2003 | Sol et al. | 219/203 |
| 2008/0302418 A1 * | 12/2008 | Buller | H01L 31/02168 136/259 |
| 2009/0044464 A1 | 2/2009 | Schmidt et al. | |
| 2009/0166347 A1 | 7/2009 | Blanchard et al. | |

FOREIGN PATENT DOCUMENTS

| | | | | |
|---|---|---|---|---|
| DE | 102004050158 | * | 4/2006 | ................ B60J 1/20 |
| EP | 0 524 537 | | 1/1993 | |
| EP | 0 849 977 | | 6/1998 | |
| GB | 2 091 528 | | 7/1982 | |
| GB | 2 381 179 | | 4/2003 | |
| WO | 2006 040498 | | 4/2006 | |
| WO | WO 2006040498 | * | 4/2006 | ............... B60H 1/00 |
| WO | 2007 083160 | | 7/2007 | |

* cited by examiner

TRANSPARENT WINDOW PANE WITH A HEATING COATING

The invention relates to a transparent window pane with an electrically heating coating, having the features of the preamble of claim 1.

Particularly in the market for vehicle windshields, there is a strong demand for heating models in which the heating itself must be as imperceptible or visually unimpeding as possible. There is therefore an increasing demand for a heating transparent coating for window panes.

One general problem of heating coatings having a low light absorption is their surface resistance which is still relatively high and, in any case for large dimensions of the window pane to be heated or for long current paths, requires a high service voltage, which in all cases is greater than the usual voltages on board vehicles. If it is desired to lower the surface resistance, this would result with the currently known laminated systems in a reduction in the visible light transmission because the conducting layers would have to be thicker.

For these technical reasons, it is still preferable at the present time to fit window panes that are heated by wires, which may be supplied with the usual on-board voltage without any problem. These composite window panes with heating fields incorporated as very fine wires are however not accepted by all customers.

It is also known (WO 2006/024809 A1) to provide such wire-heated window panes with a thermally insulating transparent coating of composite form.

Another problem with heating coatings is due to the fact that sometimes they cannot be applied uniformly over the entire surface of the transparent window pane, rather it is necessary to provide one or more interruptions, called "communication windows", which degrade the flow of the heating current and possibly result in the formation of hot spots on their edges. Such communication windows make the coating, which by nature reflects the short-wave or infrared radiation, locally more permeable to certain data streams or signals.

To inject the heating current into such coatings and extract it therefrom, at least one pair of electrodes in the form of strips or busbars is provided, which must inject the currents as uniformly as possible into the surface of the layer and distribute them over a wide front. In vehicle window panes that are substantially wider than tall, the busbars are for the most time located along the long edges of the window pane (the upper and lower edges in the mounting position) so that the heating current can flow over the shorter path over the height of the window pane. Likewise, the aforementioned communication windows are usually located on the upper edge of the window pane and extend over a width of several centimeters.

Document WO 00/72635 A1 describes a transparent substrate provided with an IR reflective coating and with a communication window produced by removing or omitting the surface coating.

Also known, from document DE 36 44 297 A1, are a number of examples in which the heating coatings of a vehicle windshield are divided. Divisions may also be produced by regions of the surface that are not provided with layers and/or by incisions made mechanically or using laser radiation. Such divisions or incisions are used to regulate and deflect in a targeted manner a flow of current within the coated surface and must ensure that the current density is as uniform as possible in the surfaces in question.

Document WO 2004/032569 A2 teaches another configuration of a transparent window pane with a heating coating, which also seeks to obtain uniformity of heating power in the surface by separating lines made in the coating.

Document DE 29 36 398 A1 relates to measurements for preventing, in a transparent window pane with a heating coating, current spikes at the transition between the busbars and the coating. In general, the aim is to reduce the sudden difference in resistance between the coating and the busbars using materials or shapes having a higher electrical resistance for said busbars, or with intermediate resistances. Suggested here are surface resistances of the coating of between 1 and 10 ohms per square. In one of the many embodiments described in the above document, the side of each busbar turned toward the opposite busbar is made in a corrugated form. The formation of spikes turned toward the heating coating must in this case be avoided. This approach seeks to substantially lengthen the line of transition between the busbar and the coating and thus reduce the current density in this transition. However, all these measures appear to be ill-suited to supplying the heating layer with a relatively low voltage.

It is also known (DE 10 2004 050 158 B3), in a window pane applicable to electrical heating, to shorten the path of the current through the coating, by in practise extending the busbars in the zone of the surface covered by the layer by means of conducting elements of low ohmic resistance in the form of conducting tracks or wires extending from the busbars right into the heating field. With this solution, the heating power may however be too low in the zone of the layer directly adjacent the busbars.

The busbars, already mentioned several times, may be produced both by printing (screen printing), whether before or after deposition of the coating on the window pane, or by soldering thin strips of metal, preferably (tinned) copper. Combinations of printed busbars and metal strips also exist (see for example DE 198 29 151 C1). Admittedly, the busbars are mostly in the form of narrow strips, however they are opaque. For optical reasons, they are consequently placed each time near the outer edge of the transparent window panes in question. Most of the time they may be masked by opaque edge coatings (generally also produced by screen printing). Likewise, the communication windows mentioned may be masked by these edge coatings insofar as the latter are sufficiently transparent for the radiation to be transmitted.

In standard vehicle windshields, these opaque coatings are produced in the form of frames, another function of which is to protect the assembly, bonded between the glass pane and the body, against UV radiation. These frames surround the field of vision of the window panes. In windshields, a distinction is also made between a field of vision A in the middle of the viewing surface, in which there may be no obstacle to vision (for example colors, wires or other damage), and the field of vision B closer to the edge.

Finally, it is known to provide separate heating of vehicle window panes that are wiped by wipers in the stop or stowed position of the wipers. Document EP 849 977 B1 describes heating with a wire loop that covers only this stowage zone. Document U.S. Pat. No. 5,434,384 and document DE 101 60 806 A1 disclose on the contrary heating panes with heating layers in which a particular heating field for the wiper stop zone is separated from the heating zone and is provided with its own busbars.

Also known (DE 10 2004 054 161 A1) is to provide, in a limited zone of the surface of a vehicle window pane designed for passage of infrared data transmission radiation, separate heating elements that must prevent degradation of the infrared transmission in this zone by condensation, snow and/or icing.

The aim of the invention is to provide another transparent window pane with a heating coating that can operate with relatively low service voltages but which nevertheless produces a uniform distribution of the heat and reliable heating in a partial zone of the surface of the window pane, for example a zone for stowing wipers, or of another partial zone (for example sensor windows or the like). For visual reasons, these zones will preferably be located on the edge of the respective window pane.

This aim is achieved according to the invention by the features of claim 1. The features of the secondary claims have advantageous embodiments of this invention.

The fact of providing heating by means of a separate heating element with heating resistors formed by wires and/or conducting tracks printed in a separate or defined edge zone, in particular in the wiper parking zone, instead of heating by means of the coating, makes it possible to achieve several advantages or to avoid certain drawbacks that affect previous window panes.

In particular, when the heating zone of the layer is narrowed by said edge zone, the path of the current through the high-resistance coating becomes a priori shorter, so that it is possible to operate here with a relatively low supply voltage. If required, it is also possible, according to one advantageous embodiment, to reduce in a known manner the distance between the busbars using additional conducting elements of low electrical resistance.

The separate heating element for the edge zone, this element being located on the same face as the coating, also ensures that this edge zone can be heated separately or independently, and thus very rapidly and very efficiently, and that no reduction in the heating power must be envisioned when the aforementioned additional conducting elements are provided on the busbars intended for the heating coating.

Admittedly this configuration is used absolutely preferably in the case of windshields, in which it is necessary for vision to be good in the central field of vision for safe driving, however heating window panes according to the invention may also be mounted in other places (for example for a rear window or side windows) in vehicles and also in other movable machines and apparatus, and likewise in buildings.

When it is applied in vehicles, the embodiment according to the invention makes it possible in particular for the windshield heating to be supplied directly with the usual 12 to 14 V DC voltage on board, which of course corresponds very well to a coating with an electrical resistance as low as possible. The length of the optional additional conducting elements is set according to the effective surface resistance of the respective coating—the better the conductivity of the coating itself, the shorter the conducting elements may be.

Likewise, this configuration allows the coating to be retained over the entire surface of the transparent window pane—with the possible exception of communication windows to be provided—so that no masking arrangement or removal of a coating is necessary. In this way, the positive properties of the coating, namely in particular the infrared reflection (thermal insulation) and the uniform coloration over the entire surface, are preserved.

The additional conducting elements as thin as possible impede vision through the window pane only in an almost imperceptible manner.

To separate the zone heated by the heating coating from the zone heated by the heating element, either the coating between the two heating zones is electrically separated, for example by a line of incision in the coating, or the coating is passivated at the heating element. In another embodiment, the surface zone heated by the heating element has preferably no coating.

Given that the transparent window pane is, in practically all cases, a composite window pane in which the coating itself is placed on a face located inside the composite, the conducting elements could also, instead of being printed, be produced by thin wires, which are fixed in a manner known per se to an adhesive film of the composite and then applied with the film to the coating, thereby bringing them into electrical contact with the coating. This contact is stable over the long term after final bonding of the composite window pane.

When they are produced in the form of structures by screen printing, the conducting elements are applied to a substrate (glass or plastic window pane or else a plastic film) preferably before the coating is deposited. This may be carried out in a single operation with the installation of the busbars.

It is also possible, with these conducting elements, with a low electrical resistance, to step over a communication window made in the coating substantially on the edge of the window pane, without the risk of forming hot spots. The currents present in the known problematic areas in the lateral edges of these communication windows are very greatly reduced by the conducting elements.

Further details and advantages of the subject of the invention will become apparent from the drawings of two exemplary embodiments of a vehicle windshield and from their detailed description that follows.

In these drawings, which are simplified representations with no particular scale:

Figure 1:
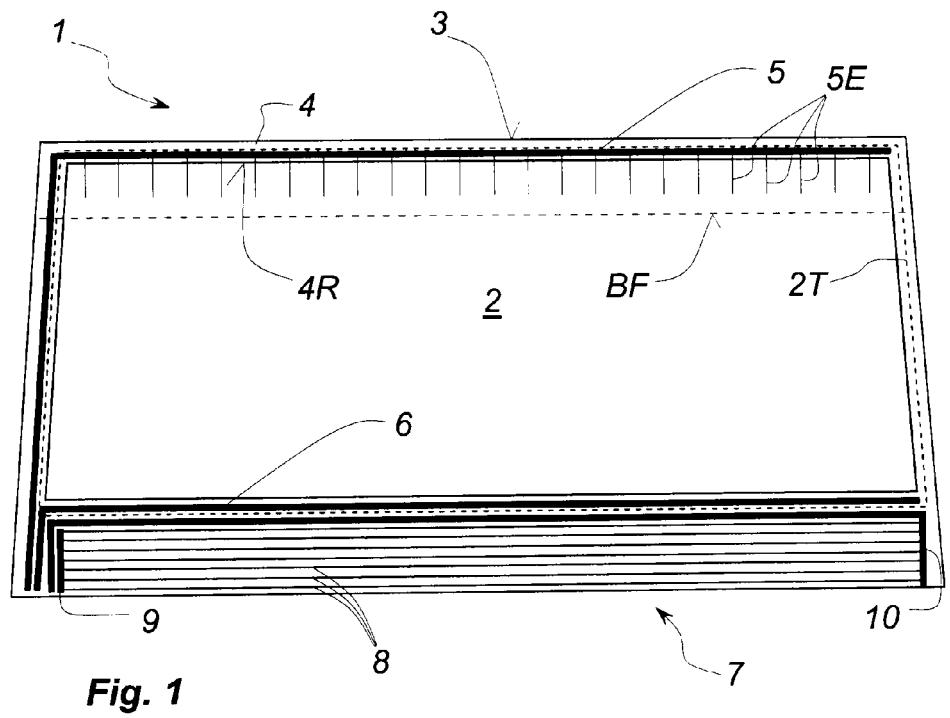
FIG. 1 shows one embodiment of a transparent window pane with an electrically heating coating in the field of vision and an additional heating element in an edge zone.

In FIG. 1, an electrically conducting and entirely transparent coating 2 is incorporated in a manner known per se into a composite heating window pane 1 of essentially trapezoidal shape.

A broken line, denoted by 2T, indicates the outer edge of the continuous coated surface is slightly set back towards the interior, on all sides, relative to the outer edge 3 of the composite window pane 1 or that an edge strip is separate from the overall coating. It thus provides, on the one hand, electrical isolation toward the outside and, on the other hand, protection of the coating against corrosive attack coming from the outer edge. The outer edge 2T may be set back by removing the coating along the edge of the window pane, by masking the substrate during deposition of the coating, or else by tracing a peripheral separating line that passes through the coating along the outer edge of the window pane. This may suffice for both isolation and corrosion protection.

The coating itself is preferably made up in a manner known per se of a multilayer system that can withstand a high thermal load with at least one, and preferably several, metal partial layers (preferably made of silver), which withstands without being damaged, that is to say without its optical, heat-reflecting and electrical properties being degraded, temperatures in excess of 650° C. that are necessary for bending glass window panes. Apart from the metal layers, the multilayer system also includes other partial layers, such as antireflection layers and possibly stop layers. A multilayer system that can be used for the objective intended here is disclosed for example in document EP 1 412 300 A1.

In relation to the present invention, it may however also be possible to use other electrically conducting multilayer systems with a lower thermal capacity, and especially also multilayer systems that are not deposited directly on a rigid glass or plastic window pane but on a plastic film (preferably a PET film). All these multilayer systems are preferably deposited by sputtering (magnetron cathode sputtering).

The surface resistance of the current multilayer systems of the abovementioned type is between 1 and 5Ω/□. Vehicle windshields provided with such multilayer systems must, by virtue of the European standards, reach an overall light transmission of at least 75%. This means that the multilayer system alone must provide an even higher optical transmission. Unfortunately, the demand for higher optical transparency is incompatible with the wish to achieve a surface resistance as low as possible for the coating. The thicker the conducting partial layers, the better they conduct the current, but the lower their transparency.

The composition and the manufacture of the coating 2 are however of secondary importance here, so that we will not dwell further thereon.

Deposited on the edge of the composite window pane 1 is a layer 4 of opaque color in the form of a frame, the inner edge 4R of which circumscribes the field of vision of the transparent window pane 1, or in other words forms the outer edge thereof. It may also lie in a plane (located to the inside or to the outside of the composite window pane) of the composite window pane other than that of the coating 2. It serves as a UV radiation protection layer for a bead of adhesive, with which the finished window pane is bonded in a vehicle body. Moreover, it acts as an optical mask for the elements for connecting the additional electrical functions of the window pane 1. However, it has no influence on the conductivity of the coating 2.

Thus it can be seen, along the upper edge of the composite window pane 1 in the zone of the surface covered by the color layer 4, a first busbar 5 and, along the lower edge, a second busbar 6. The two busbars 5 and 6 are electrically connected to the coating 2 in a manner known per se.

Many vehicle windshields are provided with a colored, but nevertheless transparent, band ("filter band") along their upper edge, which in particular reduces dazzling by the sun's rays. The window pane described here may also include such a filter band—its line of lower demarcation is indicated as an option here by a broken line BF. Below this demarcation, the field of vision of the window pane is clear, while above it is translucent and tinted and/or colored to a greater or lesser extent.

It should be pointed out here that in actual window panes (windshields), the height/width ratio may be practically square, which means that the current path in the coating may be very long when the busbars are placed along the upper and lower edges.

Figure 3:
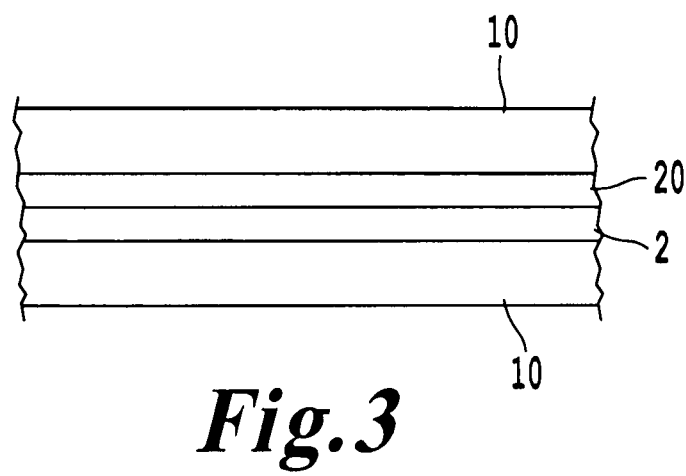
FIG. 3 illustrates a side view of the first embodiment.

The composite window pane 1 is in general made up of two rigid glass and/or plastic panes 10 and of an adhesive layer 20 that joins them together surface wise (for example a thermoplastic adhesive film made of polyvinyl butyral (PVB), ethylene/vinyl acetate (EVA) or else polyurethane (PU)). The coating 2 and the busbars 5 and 6 are applied to one of the surfaces located on the inside of the composite of one of the rigid panes and optionally bent hot at the same time as the pane, before the adhesive layer is joined and bonded to the rigid panes. A side view of pane 1 is shown in FIG. 3.

The busbars 5 and 6 may be made up of bands of thin narrow metal film (made of copper or aluminum) that are fastened to the surface of the window pane and come into electrical contact with the coating 2 at the latest during assembly of the layers of the composite. However, electrical contact may also be provided by soldering or printing the busbars 5 and 6. During subsequent treatment in an autoclave, the contact between the busbars and the coating is ensured by the action of heat and pressure.

As already indicated, the busbars 5 and 6 may, as a variant or as a complement, be produced by printing with a conductive paste, which is baked during bending of the panes. This is also appreciably less expensive than installing segments of a metal band. However, printed busbars have in all cases, during continuous industrial manufacture, a higher electrical resistance than bands of metal film. Choosing to form busbars by metal films or by screen printing is consequently possible only depending on the individual type of window pane and possibly on the total resistance of the heating system.

However, in comparison with the coating 2, the busbars 5 and 6 always have negligible electrical resistances and practically do not heat up when the heating is operating.

It is possible to provide in a manner known per se in the composite window pane 1 two (or more than two) heating fields that may be electrically supplied separately (with a vertical separation, for example in the middle of the window pane) which fields must of course also be connected by separate external connectors to the respective voltage source. In this case, a common ground conductor may be used for both heating fields so that only the busbar 5 or the busbar 6 has to be divided into two segments, while the other busbar is continuous. In the first embodiment, four external connectors are required while in the second only three are required.

In the embodiment illustrated here, with only a single heating field, the heating current flows over a wide front between the busbars 5 and 6 in the direction of the shortest dimension (the vertical direction) of the window pane 1. The upper busbar 5 runs down from the top toward the lower edge of the window pane, to the outside of the electrically active surface of the coating 2 (and therefore between the outer edge of the window pane and the separating line 2T, overlapping with the opaque colored layer 4) in such a way that it can be brought into electrical contact toward the outside at a point with the busbar 6. Of course, it is also possible to provide such a local junction of the connectors at any other point on the periphery of the window pane, or possibly also to dispense therewith so that this results in external connectors that are further apart.

In the region of the lower edge of the window pane, the opaque colored frame is substantially wider than the length of the other edges of the window pane. Likewise, the separating line 2T is set back further toward the middle of the window pane in this edge zone. In such a way, a partial surface free of heating coating, or in any case not heated, is provided in this lower edge zone. Admittedly, this partial surface may be covered by the coating, if the latter is applied over the entire surface before the window pane outline is cut. However, it is not envisaged heating this partial surface with the coating. Thus it is also possible for this partial surface not to be coated at all, by masking it, when the coating is deposited only on window panes that have already been cut, or again to remove the coating deposited on this partial surface.

It should be emphasized that this partial surface, on which the wipers are applied when the window pane is mounted in a vehicle, would be relatively narrow compared to the total area of the window pane. In the case of a sensor vision window, the partial surface will not be as wide as that shown here. It can be seen here an additional heating element 7 of in principle a conventional type, namely an array of parallel conducting wires or tracks 8 made of a material having a low electrical resistance compared to the coating, which extend parallel to the lower edge of the window pane and may be connected to an electrical voltage by means of two busbars 9 and 10. Although the busbar 9 may be quite short on the left-hand end of the heating element 7, because it is in any case in the region of external contact of the busbars 5 and 6, the right-hand busbar 10 is bent at right-angles above the heating element 7 and is extended as far as the left-hand end of the heating element 7 so that it too can be connected to the outside in the contact region. This has the advantage that a single external connection element has to be taken out of the finished window pane.

The heating element 7 may, in a manner known per se, be prefabricated in the form of a separate element on a film and may be incorporated en bloc into the composite window pane. It is also possible to place it—again in a manner known per se—on an adhesive film which is provided for assembling, by surface bonding, the rigid panes of the composite. Finally, it is also possible to manufacture it by printing on a surface of the rigid panes—in particular preferably on the surface which is also provided with the coating 2.

The heating element 7 may operate independently of the surface heating via the coating 2, but also of course at the same time as the latter if the vehicle possesses sufficient electrical resources (power of the generator). In this way, these two heating devices may also be electrically protected independently of each other.

For example, it is possible for the heating element 7 to be automatically activated wherever there is a risk of the wipers freezing up. Such automatic operation depending on the external temperature and on the degree of moisture of the air may for example be used judiciously when—which is not uncommon in practise—a vehicle is stopped with the wipers still activated and when, when next started, the possibly frozen wipers wish to start but are blocked. With automatic deicing, which includes the actual position of the wiper switch, it would be possible to avoid at least serious damage to the wiper drive system.

We will not dwell in detail here on the external connectors mentioned, because these have been described in many previous occasions in the prior art. Preferably, flat cable elements (insulating film with several parallel conducting tracks, of the type described for example in document 195 36 131 C1) are used, it being possible for these to be used without any problem in a composite window pane and to be led out therefrom.

In a manner known per se, as indicated here on the upper busbar 5, an array of conducting elements 5E may extend into the field of vision of the composite window pane 1 starting from the edge zone covered by the colored layer 3 just into the field of vision on the edge side of the window pane. These conducting elements 5E are electrically connected to the busbar 5 and to the coating 2, and have in turn a low electrical resistance compared with the latter. They are on the one hand concealed from view by the colored layer, another masking may optionally, as already indicated, be formed by a tinted color band (filter band) not shown here.

Such conducting elements (not shown here) may also, if necessary, extend into the field of vision of the composite window pane 1 from the lower busbar 6.

Whereas in conventional window panes with layer heating of this type, the heating current must flow only in the coating over the entire distance between the busbars, this distance may be reduced to values of 50 to 80% with the conducting elements according to the present invention, part of the current getting over the remaining distance in the conducting elements.

As previously, a reduced current flow over the entire surface of the coating is therefore retained because the busbars are not separated from the coating in the segments between the conducting elements.

To meet the objective of the invention already discussed above, these additional conducting elements 5E must also be in intimate electrical contact with the coating 2, in addition to them having good conductivity. Admittedly, it is possible in principle to imagine producing them in the form of wire segments. However, they are preferably printed, before deposition of the coating, on the surface of the window pane that must subsequently bear the coating.

It is also possible to print them at the same time as the busbars on the finished coating, without thereby running the risk of damaging the coating—which must also be mechanically very resistant in its recent compositions. This has the advantage that it is possible for the coating to be deposited over the entire surface of glass strips, for the outlines of the window panes to be cut, for the window panes then to be printed and finally for them to be sent to a heat treatment such as bending and/or prestressing.

From the functional standpoint, the heating current flows in the coating 2 in the same direction as in the conducting elements 5E, therefore perpendicular to the main longitudinal extension of the busbars.

Preferably, the conducting elements and the busbars are printed using a screen printing paste containing at least 80% and preferably more than 85% silver.

If printed busbars 5 and 6 are used, then optionally provided conducting elements 5E may be produced in one operation and with the same printing paste. Thereafter, it is no longer necessary to provide a separate operation for bringing the conducting elements and the busbars into electrical contact.

If the heating element 7 must also be formed by printing, it is recommended to produce it in a single screen printing operation at the same time as the busbars 5 and 6 and possibly the optional conducting elements. However, it is also possible to imagine printing the heating element 7 on a separate transfer film, which is then inserted into the composite, the heating conductors being laid on the surface of the window pane that also carries the coating 2.

The lengths, arrangements and mutual distances of the conducting elements 5E, their number and the dimensions of the busbars have been shown here only schematically. However, the relative dimensions may be seen. Although the actual busbars 5 and 6 are produced with a width of a few millimeters in the usual strip form, the conducting elements 5E may be as narrow and as invisible as possible, but substantially longer than the width of the busbars.

The individual configuration in a specific composite window pane may admittedly be predetermined to a large extent by simulations, it does however depend greatly on the magnitude or the dimensions of the specific window pane, on the type of busbars and on the electrical properties of the actual coating. For more precise details and in particular for sectional representations of these window panes, the reader may refer to document DE 10 2004 050 158 B3 already mentioned in the introduction, the disclosure of which is incorporated here.

For vehicle windshields, it is necessary in particular to ensure that the conducting elements in no case extend into the normalized field of vision A of the window pane, in which the vision cannot be impeded by any clearly visible obstacle, because of the regulatory requirements. In the field of vision B surrounding this field of vision A, there may on the contrary be small obstacles to vision.

Figure 2:
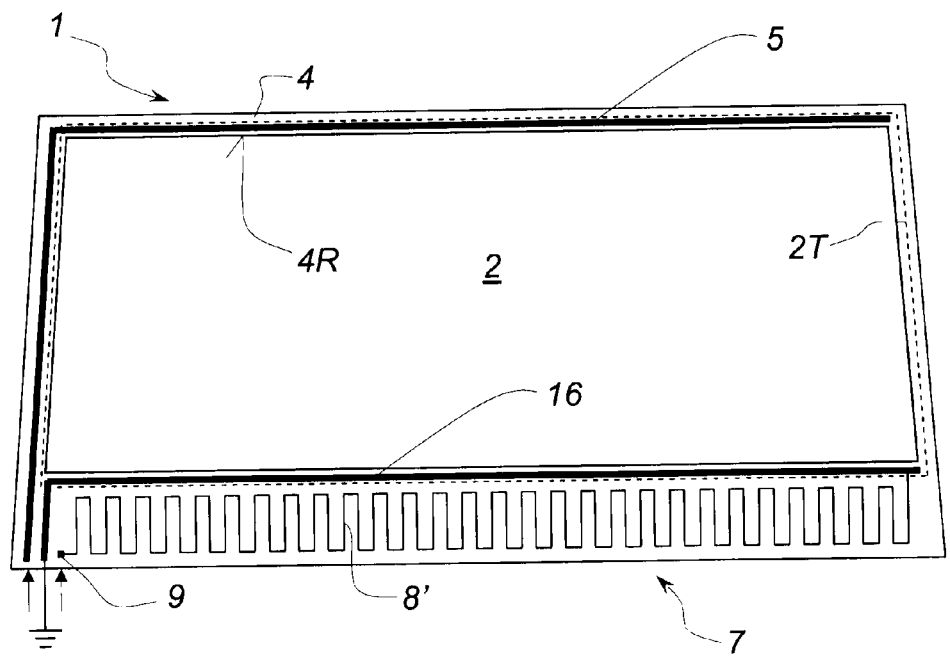
FIG. 2 illustrates a second embodiment with a variant of the separate heating element.

FIG. 2 shows a variant of the window pane 1, in which the heating element 7 is printed in the form of an individual sinuous conducting track 8', also in a manner known per se. This meander covers the entire zone in which the wipers are applied in their parked position. At the same time, a busbar 16 (as a functional unit composed of the busbar 16 and the busbar 10 of FIG. 1) also serves as a common ground conductor for the coating 2 and for the heating element 7. For this purpose, it is denoted by a ground symbol at its end on the connector side. The supply connectors for the coating 2 and for the heating element 7 are on the contrary denoted by arrows directed toward the outside (which arrows represent the direction of the current). This arrangement has, compared to FIG. 1, the advantage that only three conducting tracks or cable strands are necessary as external connectors. Optionally necessary electrical separations of the coating from the heating field are possible without any problem to the outside of the window pane 1, and also possibly to the inside of the composite (thin-film resistors, diodes, etc.).

In this embodiment according to FIG. 2, it is recommended to remove the coating 2 in the edge zone (at the bottom) of the window pane 1 or even not to deposit it at all. Given that an electrical separation between the conducting track 8' and the coating cannot easily be represented, the purpose of the meander (namely to virtually enlarge the conducting track 8') could be thwarted by a partial short circuit by the coating 2.

In the embodiment according to FIG. 1, with an array of parallel conductors, the coating 2 may on the contrary remain continuous because in this case no short-circuit effect can be envisioned.

According to yet another variant of the heating element 7, which is not shown here, it would also be possible to represent it in the form of a closed conducting loop without distinction between conducting tracks and busbars or by a plurality of conducting loops mutually imbricated with common initial and final points.

The final choice among these possible solutions depends on the electrical power to be produced, on the input voltage to be applied and in particular on the dimensions of the heating element 7.

Finally, it should be emphasized that it is also possible to modify the position in which the heating element 7 on the edge side is mounted. Whereas in particular in most vehicles the wipers are stopped along the lower edge of the window pane in the mounting position, there do exist vehicles in which the parked position of the wipers is vertical, and therefore parallel to one or both vertical edges of the mounted window pane. Of course, such window panes may also be provided with heating elements of the type described here. When it is necessary to heat two wipers, then possibly two lateral heating elements will be provided. Of course, this also applies to vehicle rear windows that are equipped with wipers.

The invention claimed is:

1. A transparent window pane comprising:
an electrically heating coating that extends over a large part of a surface of the window pane, or over its field of vision, and which is electrically connected to at least two busbars of low electrical resistance, such that, after an electrical supply voltage has been applied to the busbars, an electrical current flows in a heating field formed by the coating, the electrically heating coating extending over an area between the at least two busbars; and
a heating element including conducting elements of low electrical resistance that extend between a first heating element bus bar and a second heating element bus bar, the conducting elements being printed conducting tracks and/or wires, an entirety of the heating element being provided in a zone of the surface that is not heated by the coating and on the same face as the coating, the entire zone being located outside the area between the at least two busbars and positioned between an edge of the electrically heating coating and a lower edge of the window pane, the heating element including the first heating element bus bar and second heating element bus bar are electrically isolated from the at least two busbars and electrically isolated from the coating.

2. The window pane as claimed in claim 1, wherein the zone of the surface not heated by the coating lies on an edge of the transparent window pane.

3. The window pane as claimed in claim 1, which is a composite window pane including at least two rigid panes and an adhesive layer joining the two rigid planes together by surface bonding, and wherein the coating and the heating element lie on one face, located on the inside of the composite, of one of the rigid panes.

4. The window pane as claimed in claim 1, wherein the coating has a surface resistance of between 1 and 5 ohms/□ and includes one or more electrically conducting partial layers.

5. The window pane as claimed in claim 1, wherein the heating element includes at least a single conductor or a plurality of conductors electrically connected in parallel.

6. The window pane as claimed in claim 5, wherein the heating element is formed by printing on a surface of the window pane or on a film.

7. The window pane as claimed in claim 5, wherein the heating element includes fine wires and two busbars joining the fine wires at the end on an adhesive layer for the composite window pane or on a separate transfer film.

8. The window pane as claimed in claim 1, wherein the coating and the heating element have external connectors separated from each other and/or may be electrically supplied independently of each other.

9. The window pane as claimed in claim 1, wherein other conducting elements of low electrical resistance extend into the heating field in contact with the coating from at least one of the busbars.

10. The window pane as claimed in claim 9, wherein the conducting elements are printed lines and/or wires.

11. The window pane as claimed in claim 9, wherein the other conducting elements are placed at uniform or non-uniform distances apart.

12. The window pane as claimed in claim 9, wherein the other conducting elements all have a same length or all have different lengths.

13. The window pane as claimed in claim 9, wherein the other conducting elements are placed only over part of the longitudinal extension of one or both busbars.

14. The window pane as claimed in claim 9, wherein the other conducting elements are produced in a form of lines, open or closed loops, straight segments, arcs and/or meanders.

15. The window pane as claimed in claim 9 as a vehicle windshield, wherein the other conducting elements extend at most as far as a boundary of a standardized field of vision of the windshield.

16. The window pane as claimed in claim 1, wherein its edge is covered by an opaque colored layer at least over part of its periphery, or in a region of the busbars and in the zone heated with the heating element.

17. The window pane as claimed in claim 1, wherein the busbars are formed by printing and/or by metal films.

18. The window pane as claimed in claim 17, wherein the busbars are configured to be printed on the respective substrate before or after deposition of the coating.

19. The window pane as claimed in claim 17, wherein the busbars are
composed of metal films and are electrically connected to the coating and to other conducting elements by brazing, at least at discrete contact points.

20. The window pane as claimed in claim 1, wherein the heating element lies in a zone in which wipers provided for wiping the window pane are in a parked or stowed position.

21. The window pane as claimed in claim 20, wherein the heating element extends along one or more lateral sides of the window pane.

22. The window pane as claimed in claim 1, wherein a tinted color strip extends at least along its upper edge in the mounting position and at least partly masks the conducting elements placed in this region.

23. The window pane as claimed in claim 1, wherein a first busbar of the at least two busbars extends along a first edge of the coating and a second busbar of the at least two busbars extends along an opposite edge of the coating from the first edge, and no portion of the first busbar is located on the opposite edge of the coating.

* * * * *